United States Patent
Wu et al.

(10) Patent No.: US 10,404,084 B2
(45) Date of Patent: Sep. 3, 2019

(54) SELF-CHARGING DEVICE FOR MOBILE ROBOTS

(71) Applicant: Zhejiang Guozi Robot Technology Co., Ltd., Hangzhou (CN)

(72) Inventors: Weifeng Wu, Hangzhou (CN); Wangdong Wu, Hangzhou (CN); Chengkang Rao, Hangzhou (CN); Zhenhua Shen, Hangzhou (CN); Yikun Tao, Hangzhou (CN); Lingfen Zhu, Hangzhou (CN); Hongbo Zheng, Hangzhou (CN); Xia Wang, Hangzhou (CN); Xinfeng Du, Hangzhou (CN)

(73) Assignee: Zhejiang Guozi Robot Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/305,126

(22) PCT Filed: Oct. 8, 2016

(86) PCT No.: PCT/CN2016/101488
§ 371 (c)(1),
(2) Date: Jan. 10, 2017

(87) PCT Pub. No.: WO2018/064810
PCT Pub. Date: Apr. 12, 2018

(65) Prior Publication Data
US 2018/0375355 A1    Dec. 27, 2018

(51) Int. Cl.
*H02J 7/00*    (2006.01)
*H02J 7/14*    (2006.01)
(Continued)

(52) U.S. Cl.
CPC ............ *H02J 7/0045* (2013.01); *B25J 9/0009* (2013.01); *B25J 9/1664* (2013.01); *B60L 53/00* (2019.02);
(Continued)

(58) Field of Classification Search
USPC ........................................ 320/107, 108, 109
See application file for complete search history.

(56) References Cited

U.S. PATENT DOCUMENTS 5,892,350 A * 4/1999 Yoshikawa ........... B60L 11/182
                                                   320/107
9,056,555 B1 * 6/2015 Zhou ................... B60L 11/1827
(Continued)

FOREIGN PATENT DOCUMENTS

CN        1610208        4/2005
CN        201178120 Y    1/2009
(Continued)

OTHER PUBLICATIONS

Office Action for Chinese Patent Application No. 201610877350.5 dated Feb. 13, 2019.

*Primary Examiner* — Alexis B Pacheco
(74) *Attorney, Agent, or Firm* — Andrus Intellectual Property Law, LLP

(57) ABSTRACT

A self-charging device for mobile robots, which includes a charging cradle and a charging pin, the charging cradle includes a charging contact and a first elastic member connected with the charging contact. The charging pin is used to contact the charging contact for charging. Preferably, the charging cradle also includes a buffering block, a second elastic member and a mounting enclosure. The charging contact is connected with the buffering block through the first elastic member. The buffering block is provided encircling inside the mounting enclosure. One end of the second elastic member is connected with the buffering block, and
(Continued)

the other end is connected with the mounting enclosure. The self-charging device for mobile robots is capable of counteracting the deviation angle due to the misalignment when the mobile robot is charging, and buffering the impact force produced when the charging contact docks with the charging pin.

17 Claims, 2 Drawing Sheets

(51) Int. Cl.
  *B25J 9/00*    (2006.01)
  *H01R 13/631*   (2006.01)
  *B25J 9/16*    (2006.01)
  *H01R 13/24*    (2006.01)
  *B60L 53/00*    (2019.01)

(52) U.S. Cl.
  CPC ........... *H01R 13/24* (2013.01); *H01R 13/631* (2013.01); *H02J 7/00* (2013.01); *H01R 13/2421* (2013.01); *Y02B 40/90* (2013.01)

(56) References Cited

U.S. PATENT DOCUMENTS

| | | | | |
|---|---|---|---|---|
| 9,193,065 | B2* | 11/2015 | Wang | ............................ B25J 5/00 |
| 2004/0201361 | A1* | 10/2004 | Koh | ...................... H02J 7/0042 |
| | | | | 320/104 |
| 2005/0083011 | A1* | 4/2005 | Yang | .......................... A47L 9/00 |
| | | | | 320/107 |
| 2006/0212191 | A1* | 9/2006 | Saeki | ...................... G01C 22/00 |
| | | | | 701/23 |
| 2007/0216347 | A1* | 9/2007 | Kaneko | ................... B25J 19/005 |
| | | | | 320/107 |
| 2009/0169347 | A1 | 7/2009 | Teng et al. | |
| 2011/0089891 | A1* | 4/2011 | Pai | ........................ H02J 7/0044 |
| | | | | 320/107 |
| 2011/0316474 | A1* | 12/2011 | Kimura | ............... B60L 11/1827 |
| | | | | 320/107 |
| 2012/0242279 | A1* | 9/2012 | Tso | ........................ A47L 9/2852 |
| | | | | 320/107 |
| 2012/0286730 | A1* | 11/2012 | Bonny | ............... B60L 11/1827 |
| | | | | 320/109 |
| 2013/0295781 | A1* | 11/2013 | Gualino | ............. H01R 13/2421 |
| | | | | 439/39 |

FOREIGN PATENT DOCUMENTS

| | | |
|---|---|---|
| CN | 101714676 A | 5/2010 |
| CN | 202333860 | 7/2012 |
| CN | 102904307 A | 1/2013 |
| CN | 103915720 A | 7/2014 |
| CN | 104734291 | 6/2015 |
| CN | 105234944 A | 1/2016 |
| CN | 105634080 | 6/2016 |
| CN | 205304328 U | 6/2016 |
| CN | 106374257 | 2/2017 |
| CN | 206116706 | 4/2017 |
| WO | 0243191 | 5/2002 |

\* cited by examiner

SELF-CHARGING DEVICE FOR MOBILE ROBOTS

CROSS-REFERENCE TO RELATED APPLICATIONS

This application claims priority to PCT/CN2016/101488, filed Oct. 8, 2016.

FIELD OF THE INVENTION

The present invention pertains to the field of warehouse logistics auxiliary devices, and in particular relates to a self-charging device for mobile robots.

DESCRIPTION OF THE PRIOR ART

An unmanned handling robot, also known as an automated guided vehicle (AGV), is an equipment for use in the field of automated material handling, which has the advantages of high automation, flexible application, safety and reliability, high efficiency and convenient maintenance, and thus it is widely used in logistics transportation places such as automobile manufacturing industry, food industry, tobacco industry and construction machinery industry, and it has some impact on the public service places such as airport, hospital, office building. These advantages also make the unmanned handling robot a critical equipment in the modern logistics system and consequently one of important members in the "machine substitution for human labor" project.

Since the power supply system of the unmanned handling robot is an on-board power source, it needs to be charged to operate. With conventional manually charging, the labor has to be increased, so a self-charging device for handling robots is developed. The self-charging device needs to take into account the problem of the accuracy of charging docking, as well as the carrying capacity of the charge contact when charged with a large current. A mobile robot, when docking automatically for charging, often fails to dock due to the docking angle deviation, and thus cannot efficiently accomplish the self-charging action, and tends to damage the equipment.

SUMMARY OF THE INVENTION

To solve the above-described problems, the present invention proposes a self-charging device for mobile robots, which is capable of counteracting the deviation angle due to the misalignment when a mobile robot is charged.

The present invention discloses a self-charging device for mobile robots, which includes a charging cradle and a charging pin, the charging cradle includes a charging contact and a first elastic member connected with the charging contact; the charging pin is used to contact the charging contact for charging. The charging contact and the first elastic member provide the charging cradle with a first degree of freedom and a second degree of freedom. When the charging pin docks with the charging contact to produce an impact force, the first elastic member may buffer the impact force and swing within a small range, thereby counteracting the deviation angle produced by the misalignment when the charging pin docks with the charging contact for charging, and causing the charging contact to press against the charging pin.

Further, the first elastic member is a first spring.

Further, the charging cradle also includes a buffering block, a second elastic member and a mounting enclosure; the charging contact is connected with the buffering block through the first elastic member; the buffering block is provided encircling inside the mounting enclosure; one end of the second elastic member is connected with the buffering block, and the other end is connected with the mounting enclosure. The buffering block, the mounting enclosure and the second elastic member also provide the charging cradle with a second degree of freedom. The buffering block may cause the charging contact to slide within the mounting enclosure with deformation of the second elastic member, and when the charging pin docks with the charging contact to produce an impact force, the second elastic member also may buffer the impact force.

Further, the second elastic member is a second spring. Preferably, the second spring is larger than the first spring.

Further, the charging cradle also includes a contact stopper; the contact stopper is provided encircling outside the charging contact, the charging contact exposes the contact stopper; the contact stopper is an insulating material.

Further, the number of the first elastic members is equal to the number of the charging contacts.

Further, the length of the outer surface of the charging pin is greater than that of the outer surface of the charging contact. This is advantageous for counteracting the positioning deviation when the charging pin docks with the charging contact for charging, as long as the charging contact is in contact with any segment of the charging pin.

Further, the outer surface of the charging pin is rectangle, and the outer surface of the charging contact is square; and the width of the rectangle is greater than or equal to that of the square.

In another embodiment, the length of the outer surface of the charging pin is less than that of the outer surface of the charging contact. This is advantageous for counteracting the positioning deviation when the charging pin docks with the charging contact for charging, as long as the charging contact is in contact with any segment of the charging pin.

Further, the charging pin and the charging contact each contain an anode and a cathode of power source.

Further, the number of the charging pins is equal to the number of the charging contacts.

Preferably, the number of the charging pins and the number of the charging contacts are two or three.

Further, the charging pin is arranged on the mobile robot.

The advantageous effects of the present invention are: the mobile robot will autonomously moves to the charging cradle when it needs to be charged, and the mobile robot is charged through the contact of the charging pin mounted on the mobile robot with the charging contact mounted at the front end of the charging cradle, the angular deviation produced when the mobile robot aligns with the charging cradle for charging is counteracted by the first degree of freedom of the charging cradle; the impact force produced when the mobile robot aligns with the charging cradle for charging is buffered by the first degree of freedom and the second degree of freedom of the charging cradle; the displacement deviation produced when the mobile robot aligns with the charging cradle for charging is counteracted by the difference in shape and dimension of the charging pin and the charging contact. The self-charging device for mobile robots may be adapted to be charged with a large current.

The concepts, the specific structures and the technical effects of the present invention are described further below in conjunction with the accompanying drawings, in order to fully understand the objects, features and effects of the present invention.

DETAILED DESCRIPTION OF THE PREFERRED EMBODIMENTS

Figure 1:
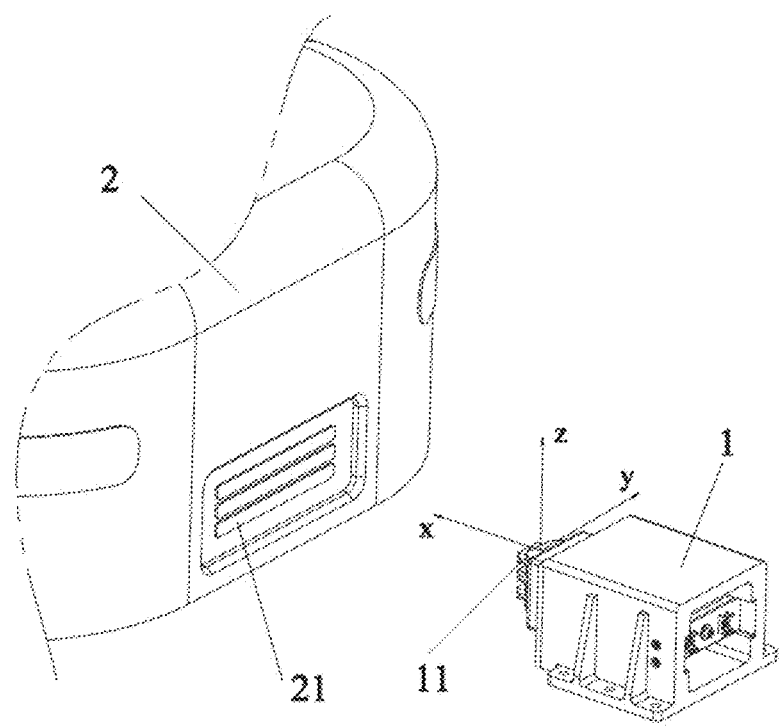
FIG. 1 is a schematic perspective view of a specific embodiment of the self-charging device for mobile robots according to the present invention.
Figure 2:
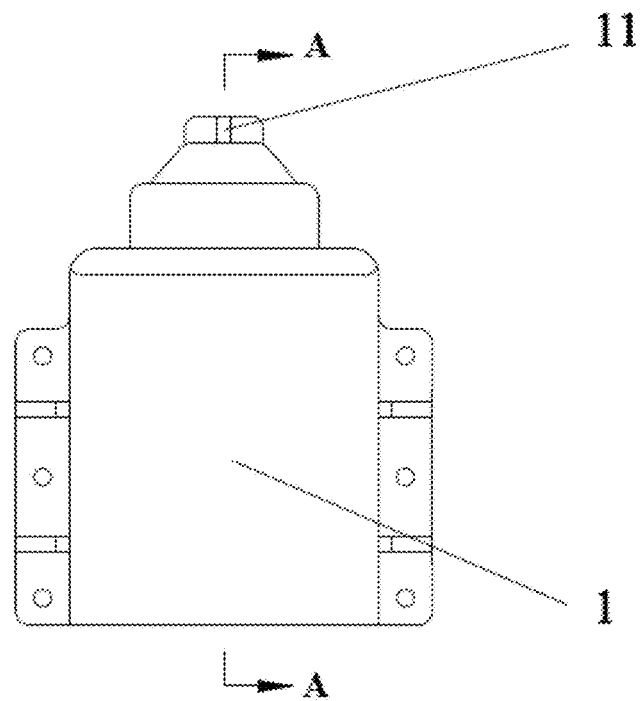
FIG. 2 is a top view of a specific embodiment of the charging cradle according to the present invention.
Figure 3:
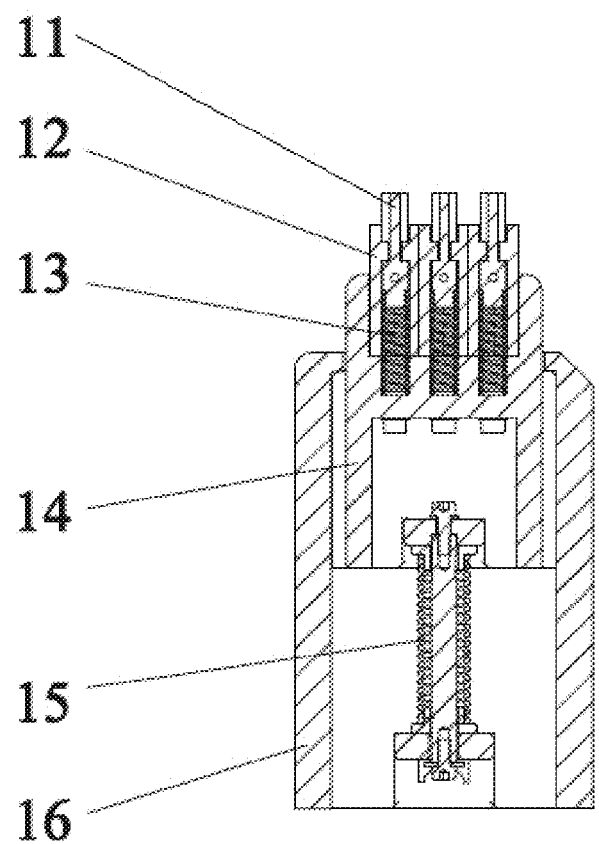
FIG. 3 is a cross-sectional view taken along line A-A of FIG. 2.

FIG. 1 shows a preferred embodiment of a self-charging device for mobile robots according to the present invention. In this embodiment, the self-charging device for mobile robots includes a charging cradle 1 and a charging pin 21. The charging pin 21 is arranged on a mobile robot 2. FIG. 2 and FIG. 3 show a charging cradle of a specific embodiment of the self-charging device for mobile robots according to the present invention. The charging cradle 1 includes a charging contact 11, a charging stopper 12, a first elastic member 13, a buffering block 14, a second elastic member 15 and a mounting enclosure 16.

The charging contact 11 is connected with the buffering block 14 through the first elastic member 13. The buffering block 14 is provided encircling inside the mounting enclosure 16, and the charging contact 11 is exposed. One end of the second elastic member 15 is connected with the buffering block 14, and the other end of the second elastic member 15 is connected with the mounting enclosure 16. The charging contact 11 and the first elastic member 13 provide the charging cradle 1 with a first degree of freedom (for rotation about the Z-axis) and a second degree of freedom (in the X-axis direction). The buffering block 14, the mounting enclosure 16 and the second elastic member 15 also provide the charging cradle 1 with a second degree of freedom (in the X-axis direction).

The function of the first degree of freedom is that: the charging contact 11 swings within a small range about Z axis within the contact stopper 12 on deformation of the first elastic member 13, thereby counteracting the deviation angle produced by the misalignment when the charging pin 21 docks with the charging contact 11 for charging.

The function of the second degree of freedom is that: when the charging pin 21 docks with the charging contact 11 to produce an impact force along the X-axis direction, the first elastic member 13 and the second elastic member 15 may buffer the impact force while causing the charging contact 11 to press against the charging pin 21.

In this embodiment, the number of the first elastic members 13, the number of the charging contacts 11 and the number of the charging pins 21 are all three. The length of the outer surface of the charging pin 21 is greater than that of the outer surface of the charging contact 11. The length here is referred to as the length along the Y-axis direction. This is advantageous for counteracting the positioning deviation when the charging pin docks with the charging contact for charging, as long as the charging contact is in contact with any segment of the charging pin. The outer surface of the charging pin 21 is rectangle, and the outer surface of the charging contact 11 is square, and the width of the rectangle is greater than that of the square. The charging pin 21 and the charging contact 11 each contain an anode and a cathode of power source. The contact stopper 12 is made of an insulating material. The first elastic member 13 is a first spring; and the second elastic member 15 is a second spring.

The preferred specific embodiments of the invention have been described in detail above. It is to be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. A self-charging device for mobile robots comprising a charging cradle and a charging pin, the charging cradle comprises a charging contact and a first elastic member connected with the charging contact; the charging pin is used to contact the charging contact for charging; wherein
   the charging cradle also comprises a buffering block, a second elastic member and a mounting enclosure; the charging contact is connected with the buffering block through the first elastic member; the first elastic member is disposed between the charging contact and the buffering block; the buffering block is provided encircling inside the mounting enclosure; one end of the second elastic member is connected with the buffering block, and the other end is connected with the mounting enclosure; the second elastic member is disposed between the buffering block and the mounting enclosure, the first elastic member and the second elastic member are respectively disposed at two opposite sides of the buffering block.

2. The self-charging device for mobile robots according to claim 1, wherein the charging cradle also comprises a contact stopper; the contact stopper is provided encircling outside the charging contact, the charging contact exposes from the contact stopper; the contact stopper is made of an insulating material.

3. The self-charging device for mobile robots according to claim 1, wherein the number of the first elastic members is equal to the number of the charging contacts.

4. The self-charging device for mobile robots according to claim 1, wherein the length of the outer surface of the charging pin is greater than that of the outer surface of the charging contact.

5. The self-charging device for mobile robots according to claim 1, wherein the length of the outer surface of the charging pin is less than that of the outer surface of the charging contact.

6. The self-charging device for mobile robots according to claim 1, wherein the charging pin and the charging contact each contain an anode and a cathode of power source.

7. The self-charging device for mobile robots according to claim 1, wherein the number of the charging pins is equal to the number of the charging contacts.

8. The self-charging device for mobile robots according to claim 7, wherein the number is two or three.

9. The self-charging device for mobile robots according to claim 1, wherein the charging pin is arranged on the mobile robot.

10. The self-charging device for mobile robots according to claim 1, wherein the charging pin is arranged on the mobile robot.

11. The self-charging device for mobile robots according to claim 2, wherein the charging pin is arranged on the mobile robot.

12. The self-charging device for mobile robots according to claim 3, wherein the charging pin is arranged on the mobile robot.

13. The self-charging device for mobile robots according to claim 4, wherein the charging pin is arranged on the mobile robot.

14. The self-charging device for mobile robots according to claim 5, wherein the charging pin is arranged on the mobile robot.

15. The self-charging device for mobile robots according to claim 6, wherein the charging pin is arranged on the mobile robot.

16. The self-charging device for mobile robots according to claim 7, wherein the charging pin is arranged on the mobile robot.

17. The self-charging device for mobile robots according to claim 8, wherein the charging pin is arranged on the mobile robot.

* * * * *